(12) United States Patent
Milbrandt

(10) Patent No.: US 6,636,603 B1
(45) Date of Patent: Oct. 21, 2003

(54) SYSTEM AND METHOD FOR DETERMINING THE TRANSMIT POWER OF A COMMUNICATION DEVICE OPERATING ON DIGITAL SUBSCRIBER LINES

(75) Inventor: Celite Milbrandt, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/364,775

(22) Filed: Jul. 30, 1999

(51) Int. Cl.⁷ .............................. H04M 1/00; H04M 9/00
(52) U.S. Cl. ......................... 379/399.01; 379/399.02; 375/222; 375/227; 370/255
(58) Field of Search ................. 379/399.01, 399.02, 379/414, 416, 417; 455/67.1, 115, 226.1–226.3; 370/201, 252, 318; 375/219–222, 227

(56) References Cited

U.S. PATENT DOCUMENTS

| | | |
|---|---|---|
| 3,903,378 A | 9/1975 | Lee et al. |
| 3,989,907 A | 11/1976 | Chambers, Jr. |
| 5,117,417 A | 5/1992 | Danner |
| 5,265,151 A * | 11/1993 | Goldstein |
| 5,347,566 A | 9/1994 | Law et al. |
| 5,390,239 A | 2/1995 | Morris et al. |
| 5,430,793 A | 7/1995 | Ueltzen et al. |
| 5,673,290 A | 9/1997 | Cioffi |
| 5,678,198 A | 10/1997 | Lemson |
| 5,701,292 A | 12/1997 | Chiussi et al. |
| 5,751,802 A | 5/1998 | Carr et al. |
| 5,778,049 A | 7/1998 | Young et al. |
| 5,784,406 A | 7/1998 | DeJaco et al. |
| 5,793,751 A | 8/1998 | Baker et al. |
| 5,796,723 A | 8/1998 | Bencheck et al. |
| 5,805,577 A | 9/1998 | Jain et al. |
| 5,805,668 A | 9/1998 | Kim |
| 5,822,374 A | 10/1998 | Levin |
| 5,828,748 A | 10/1998 | Akhteruzzaman |
| 5,841,841 A | 11/1998 | Dodds et al. |
| 5,864,541 A | 1/1999 | Abu-Amara et al. |
| 5,867,483 A | 2/1999 | Ennis, Jr. et al. |
| 6,069,922 A * | 5/2000 | Dyke |
| 6,091,713 A * | 7/2000 | Lechleider et al. |
| 6,094,459 A * | 7/2000 | Kao et al. |
| 6,549,568 B1 * | 4/2003 | Bingel |

OTHER PUBLICATIONS

"Probing Techniques for Multiuser Channels with Power Control" by C. J. Hansen 1997.

* cited by examiner

Primary Examiner—Duc Nguyen
(74) Attorney, Agent, or Firm—Baker Botts, L.L.P.

(57) ABSTRACT

A system for determining the transmit power of a communication device operating on a twisted pair subscriber line includes a communication server coupled to a first subscriber line and a second subscriber line. The communication server comprises a communication device that communicates a signal using the first subscriber line. A memory coupled to the communication server stores noise information and cross-channel-coupling information for the first subscriber line and the second subscriber line. A processor coupled to the memory determines the transmit power of the communication device based upon the noise information and the cross-channel-coupling information.

28 Claims, 5 Drawing Sheets

| COMMUNICATION DEVICE | SUBSCRIBER LINE | COMMUNICATION PROTOCOL | NUMBER OF CONNECTION ATTEMPTS |
|---|---|---|---|
| 214-555-1234 | 214-555-3129 | xDSL | 2 |
| 214-555-9765 | 214-555-2199 | xDSL | 1 |
| 214-555-7069 | 214-555-2177 | V.90 | 1 |
| ⋮ | ⋮ | ⋮ | ⋮ |
| 214-555-2163 | 214-555-8818 | xDSL | 3 |
| 214-555-3976 | 214-555-6255 | xDSL | 2 |

402   404   406   408

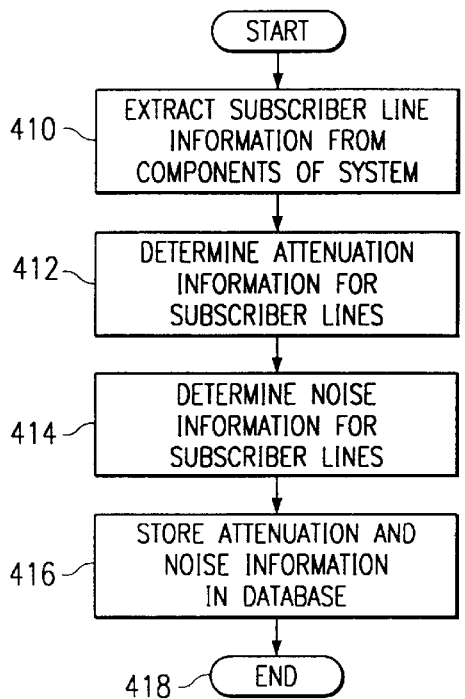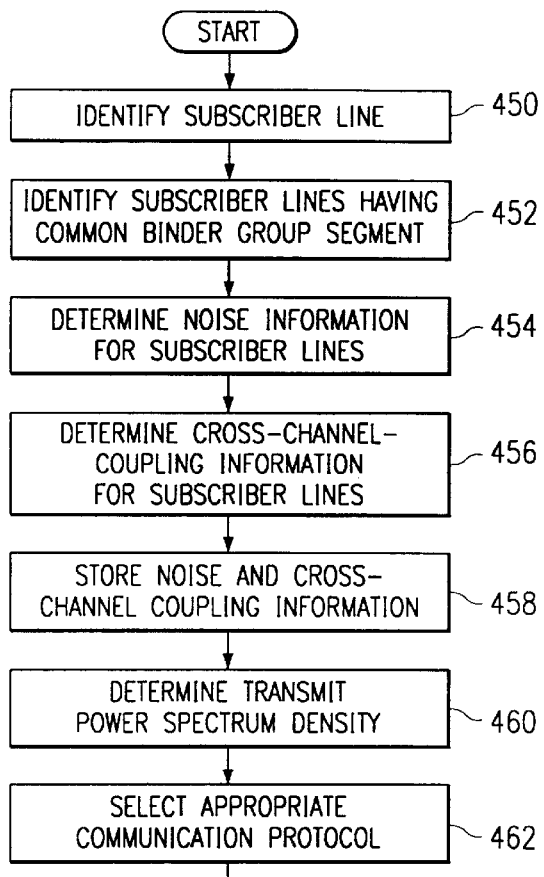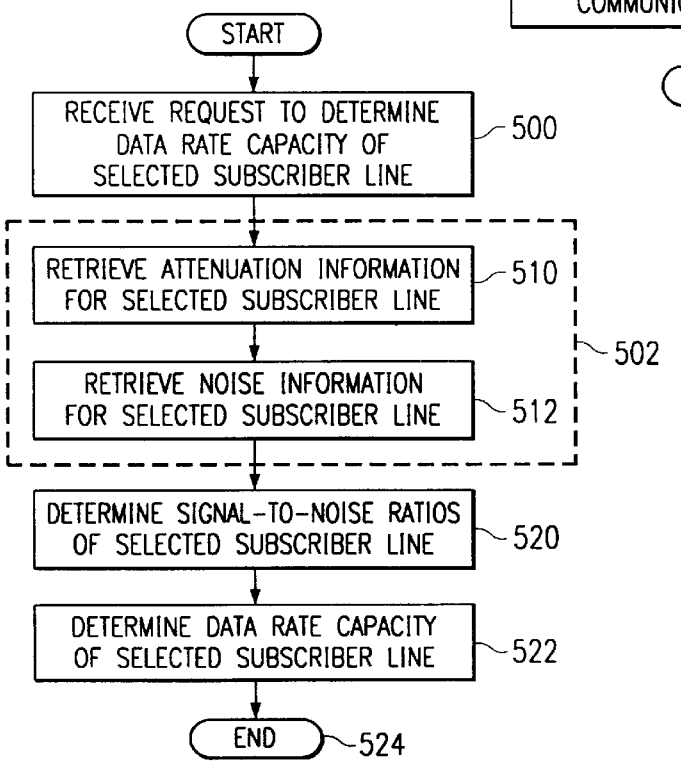

SYSTEM AND METHOD FOR DETERMINING THE TRANSMIT POWER OF A COMMUNICATION DEVICE OPERATING ON DIGITAL SUBSCRIBER LINES

CROSS-REFERENCE TO RELATED APPLICATIONS

This application is related to and filed concurrently with pending U.S. patent application Ser. No. 09/365,163, entitled "System and Method for Determining the Data Rate Capacity of Digital Subscriber Lines" and pending U.S. patent application Ser. No. 09/364,332, entitled "System and Method for Determining a Communication Protocol of a Communication Device Operating on Digital Subscriber Lines." These applications have been commonly assigned to Cisco Technology, Inc.

TECHNICAL FIELD OF THE INVENTION

This invention relates in general to data communication, and more particularly to determining the transmit power of a communication device operating on digital subscriber lines.

BACKGROUND OF THE INVENTION

Traditional telephone networks are designed to provide voice transmissions, and performs this function well. In general, however, the existing telephone networks are not adept at high speed data transmission. Digital Subscriber Line technology (DSL) uses existing twisted pair telephone lines to transport high bandwidth data, such as multimedia, video on demand, and Internet access, to data service subscribers. DSL technology uses a DSL transceiver unit (e.g. modems, splitters, and other communication equipment) at the central office of the data services provider and at the subscriber premises to utilize a greater range of frequencies of the telephone line than traditional telephone services, resulting in high speed data transmission.

To receive data services, therefore, a subscriber must install the proper communication equipment at the subscriber premises to support transmitting and receiving data using DSL technology over the existing telephone lines. Under certain circumstances, even a subscriber having the proper communication equipment may be unable to receive data services using particular DSL technologies. Since the communication equipment required at the subscriber premises may be expensive and the quality of data services received is uncertain, a potential data services subscriber may request from the data services provider an estimate of the data rate capacity of the telephone line servicing the potential subscriber before installing the communication equipment.

The data rate capacity of an existing telephone line generally defines the maximum throughput of the telephone line and typically depends on a number of factors. For example, the data rate capacity of a particular telephone line depends on the length of the telephone line, the gauge of wiring used in the telephone line, and the number and type of noise or interference producing elements present near the telephone line. A typical telephone line may be arranged in one or more binder group segments. In general, a binder group segment comprises a collection of telephone lines that share a common sheath. Each of the factors which affects the data rate capacity of a particular telephone line may vary among the different binder group segments of that telephone line. In addition, the provisioning of data services to a subscriber premises over a telephone line in a particular binder group may contribute to the noise and distortion upon other telephone lines within the same binder group, thereby degrading the services already provided to other subscriber premises.

Due to the number of factors affecting the data rate capacity of a particular telephone line, data services providers often cannot provide an accurate estimate of the data rate capacity to a potential subscriber. In some cases, a data services provider may perform a "truck roll"—the dispatch of a service technician to install communication equipment or to configure the telephone line at the customer premises—to determine the data rate capacity of a particular telephone line. A truck roll, however, is time consuming and cost prohibitive for the data services provider and the subscriber.

SUMMARY OF THE INVENTION

In accordance with the present invention, a system for determining the transmit power of a communication device operating on digital subscriber lines is provided which substantially eliminates or reduces disadvantages and problems associated with previous communication systems.

In accordance with one embodiment of the present invention, a system for determining the transmit power of a communication device operating on a twisted pair subscriber line includes a communication server coupled to a first subscriber line and a second subscriber line. The communication server comprises a communication device that communicates a signal using the first subscriber line. The system includes a memory coupled to the communication server that stores noise information and cross-channel-coupling information for the first subscriber line and the second subscriber line. A processor coupled to the memory determines the transmit power of the communication device based upon the noise information and the cross-channel-coupling information.

Another embodiment of the present invention is a method for determining the transmit power of a communication device operating on a twisted pair subscriber line. The method includes storing noise information for a first subscriber line and a second subscriber line. The method continues by storing cross-channel-coupling information for a first subscriber line and a second subscriber line. The method concludes by determining the transmit power of a communication device operating on the first subscriber line based upon the noise information and the cross-channel-coupling information.

Technical advantages of the present invention include a system for determining the data rate capacity of a twisted pair subscriber line that includes a communication server, a memory, and a processor. The memory stores attenuation information, noise information, or any other subscriber line information for a plurality of subscriber lines. The processor determines the data rate capacity of a selected subscriber line using the attenuation information and the noise information. In this respect, a data services provider in the system may pre-provision data rates for the subscriber line of a subscriber prior to activating data services for the communication equipment at the subscriber premises.

An important advantage of the system is that the communication server includes one or more communication devices that support determining subscriber line information while providing data services to subscribers during operation. The processor collects the subscriber line information from the communication server for storage in the memory. In this respect, the processor may collect subscriber line information from a number of communication servers in the system.

Another advantage of the system is that the memory can store attenuation information for a particular subscriber line based upon the constituent binder group segments of the subscriber line. The processor may then determine the attenuation information of a selected subscriber line according to the attenuation characteristics contributed by each of its constituent binder group segments. In this respect, the system may more accurately determine the data rate capacity of a selected subscriber line.

Another advantage of the present invention is a system for determining the transmit power of a communication device operating on a subscriber line of the system. The system includes a communication server having a communication device that operates on the subscriber line, a memory, and a processor. The memory stores noise information and cross-channel-coupling information for a plurality of subscriber lines in the system. The processor determines the transmit power of the communication device based upon the noise information and the cross-channel-coupling information. By determining the optimal transmit power of a communication device, the system may provide data services to a subscriber that does not degrade the data services provided to other subscribers.

A further advantage provided by the present invention is that the system may select a communication protocol for the communication device that is best adapted to provided the determined transmit power spectrum. In some instances when the communication device is inoperable to communicate data using a first communication protocol, such as an XDSL communication protocol, the system may operate the communication device using an alternative communication protocol, such as a V-series communication protocol. In this respect, a subscriber of the system is less likely to suffer a loss of data services.

Other technical advantages are readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying drawings, in which like reference numbers indicate like features and wherein:

FIG. 5 illustrates a method for managing subscriber line information for the communication system;

FIG. 6 illustrates a method for determining the transmit power of communication devices operating on a subscriber line of the communication system;

FIG. 7 illustrates a method for determining the data rate capacity of a subscriber line of the communication system.

DETAILED DESCRIPTION OF THE INVENTION

Figure 1:
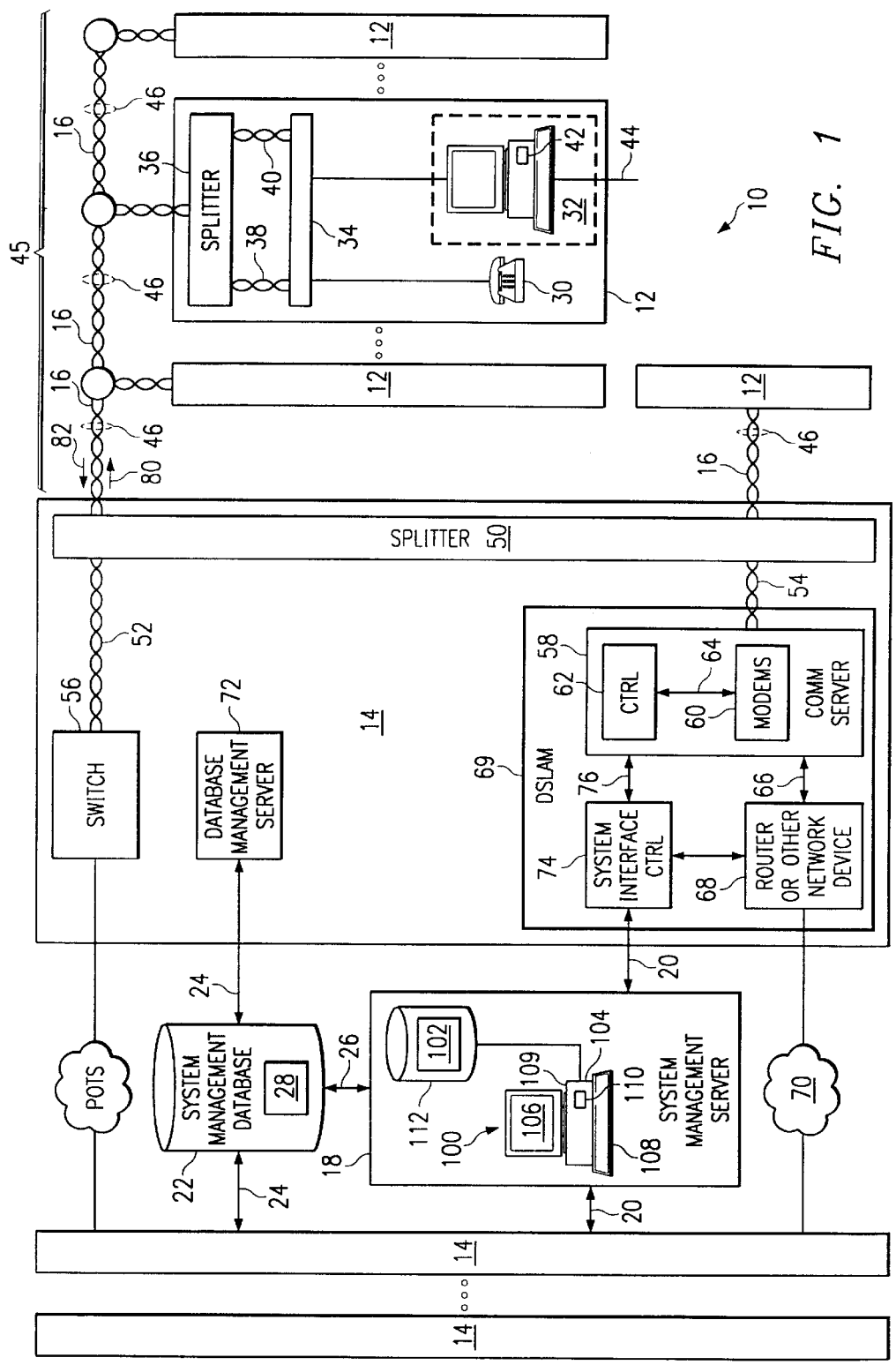
FIG. 1 illustrates a block diagram of a communication system that provides telephone and data service to subscribers in accordance with the present invention.

FIG. 1 illustrates a communication system 10 that provides both telephone and data services to subscribers 12. Each of several central offices 14 is coupled to a number of subscribers 12 using subscriber lines 16. A system management server 18 is coupled to each central office 14 using a data link 20. A system management database 22 is coupled to each central office 14 using a data link 24 and coupled to server 18 using a data link 26. In general, database 22 stores subscriber line information 28 and communication device information 29 defining the physical and operating characteristics of subscriber lines 16 and communication devices 60 of communication system 10, respectively. In one aspect of operation, system management server 18 determines the approximate data rate capacity of selected subscriber lines 16 for subscribers 12 using subscriber line information 28 stored in database 22. In another aspect of operation, server 18 determines the optimal transmit power for a communication device operating on a subscriber line 16. In yet another aspect of operation, server 18 determines that a communication device 60 is inoperable to communicate with a communication device 42 using a first communication protocol and, in response, initiates the operation of communication device 60 using an alternative communication protocol.

Subscriber 12 includes a telephone 30 and a computer 32, both coupled to an interface 34. A splitter 36 is coupled to subscriber line 16 and operates to split subscriber lines 16 into a twisted pair phone line 38 and a twisted pair data line 40. In a particular embodiment of system 10 employing the "G.lite" standards of the International Telecommunications Union—Telecommunications Standard Section, splitter 36 need not be used. Phone line 38 is coupled to telephone 30 using interface 34. Similarly, data line 40 is coupled to computer 32 using interface 34. Subscriber 12 refers to the subscriber premises shown in FIG. 1, one or more components at the subscriber premises, as well as the user of these components.

Telephone 30 is a traditional telephone transceiver, a cordless telephone transceiver, or any other device suitable for allowing communication over telephone line 38. Computer 32 comprises a mainframe device, mini-frame device, server, desktop personal computer, notebook personal computer, or other suitable computing device. A computer 32 of a subscriber 12 already equipped to receive data service from communication system 10 includes an XDSL modem 42 that communicates data using data line 40. Subscribers 12 seeking to obtain but which do not currently receive data service from communication system 10 may or may not yet be equipped with a modem 42, and are generally referred to as new subscribers 12. Modem 42 couples to other components of computer 32 using a Peripheral Component Interconnect (PCI) bus, an Industrial Standard Architecture (ISA) bus, a Personal Computer Memory Card International Association (PCMCIA) Interface, or any other suitable technology that provides input/output capability to computer 32. The selection and design of modem 42 for computer 32 may depend on the type or functionality of computer 32, the data rate capacity supported by data line 40, and the communication protocols supported by central office 14, as described in greater detail below.

Modem 42 comprises any suitable communication device that transmits and receives data in communication system 10 using any suitable digital subscriber line technology (xDSL), referred to generally as an XDSL communication protocol. Modem 42 also supports Ethernet; fast Ethernet; V-series data protocols such as V.32bis, V.32terbo, V.34, V.42, V.42bis, and V.90; data frame relay; Asynchronous Transfer Mode (ATM); switched multi-mega-bit data service (SMDS); high level data link control (HDLC); serial line Internet protocol (SLIP); point-to-point protocol (PPP); transmission control protocol/Internet protocol (TCP/IP); or any other appropriate protocol, collectively referred to as digital communication protocols. Digital communication protocols and XDSL communication protocols may be generically and/or collectively referred to as communication protocols. Computer 32 may include a network interface to receive data from central office 14 or to further communicate data to a local area network (LAN), wide area network (WAN), or other suitable network coupled to computer 32 using link 44. In general, modem 42 translates information between the communication protocol supported by communication system 10 and the digital protocol supported by computer 32.

Interface 34 couples phone line 38 to telephone 30, and data line 40 to computer 32. In one embodiment, interface 34 provides additional couplings to additional telephones 30 and computers 32 at subscriber 12. Splitter 36 is a passive or active splitter that divides subscriber line 16 into phone line 38 and data line 40 of the same type. Throughout this description, phone line 38 and data line 40 may be referred to specifically, or collectively as part of subscriber line 16.

Communication system 10 includes a plurality of central offices 14 coupled to system management server 18 and system management database 22. Each central office 14 is coupled to subscribers 12 using twisted pair subscriber lines 16. In an exemplary embodiment, each central office 14 provides phone and data service to many subscribers, with each subscriber 12 including one or more components described above at its premises. The subscribers and subscriber lines in communication system 10 are referred to collectively in the plural as subscribers 12 and subscriber lines 16.

Subscriber line 16 couples subscriber 12 to central office 14. Subscriber line 16 comprises twisted pair wiring that is commonly installed at subscriber premises and as the local loop in many public switched telephone networks (PSTNs). Subscriber line 16 may be unshielded twisted pair (UTP), shielded twisted pair (STP), or any other suitable type or category of twisted pair wiring made of copper or other suitable material. Phone line 38 and data line 40 associated with subscriber line 16 may be the same or different type or category of twisted pair wiring. A subscriber line 16 between central office 14 and a particular subscriber 12 may be arranged in a binder group 45 comprising one or more binder group segments 46. In general, a binder group segment 46 comprises a collection of subscriber lines 16 that share a common "sheath." Interference between subscriber lines 16 in a binder group 45 presents a level of complexity in xDSL deployment, as described in greater detail below with regard to FIG. 2.

In general, communication system 10 employs xDSL technology to provide high-bandwidth downlink data rates 80 and uplink data rates 82 for subscriber lines 16. Data rates 80 and 82 comprise a measure of the number of data bits that may be transmitted by subscriber line 16 from central office 14 to subscriber 12 and from subscriber 12 to central office 14, respectively, as a function of time. Typically, data rates 80 and 82 of a subscriber line 16 depend on a number of physical and operational characteristics of the subscriber line 16, including the length of subscriber line 16; its wire gauge; and the presence of bridged taps, cross-coupled interference, or any other noise or interference producing elements, generally referred to as disturbers, in system 10. Information defining the physical and operational characteristics of a subscriber line 16 is generally referred to as subscriber line information 28.

Downlink data rate 80 and uplink data rate 82 depend on the specific communication protocol employed, the quality and length of subscriber line 16, the contribution of noise and distortion from other components in communication system 10, and any other physical or operational characteristics of a subscriber line 16. A particular advantage provided by communication system 10 is that system management server 18 may approximate downlink data rate 80 and uplink data rate 82 for a particular subscriber line 16 using the physical and operational characteristics of the particular subscriber line 16 and other subscriber lines 16 as indicated by subscriber line information 28 stored in database 22. In this regard, a central office 14 may pre-provision data rates 80 and 82 for a subscriber line 16 of a new subscriber 12 prior to activating data services for modem 42 or for any other communication equipment at subscriber premises 12.

Central office 14 includes a splitter 50 coupled to subscriber lines 16. Like splitter 36 at subscriber 12, splitter 50 at central office 14 is a passive or active splitter that divides subscriber line 16 into a twisted pair phone line 52 and a twisted pair data line 54. Phone line 52 and data line 54 associated with subscriber line 16 may be the same or different type or category of twisted pair wiring. A telephone switch 56 at central office 14 is coupled to phone line 52 to provide plain old telephone system (POTS) service to subscriber 12. Telephone switch 56 also represents other components in the PSTN or other suitable voice communication network, such as switches, wireline or wireless links, satellites, microwave links, and other communication facilities to deliver telephone service to subscriber 12.

A communication server 58 comprises any suitable combination of hardware and software that resides at central office 14, at a remote terminal, or any other suitable access point in system 10 that allows coupling to local loops formed by subscriber lines 16. In one embodiment, a communication server 58 couples to splitter 50 of central office 14 using data line 54. Generally, communication server 58 manages the provisioning of data service to subscriber 12, and includes modems 60 coupled to a controller 62 using a link 64.

A modem 60 comprises any suitable communication device that transmits and receives data in communication system 10 using any suitable communication protocol supported by subscriber lines 16. Modems 60 may be integrated into any suitable chipset that includes the appropriate hardware and memory to support the data scrambling and descrambling, encoding and decoding, interleaving and deinterleaving, data insertion and extraction, filtering, amplifying, and other signal processing techniques employed by the appropriate communication protocols. Modem 60 refers to one or more modems at central office 14, as well as any of the components of the modem chipset.

Controller 62 comprises any suitable combination of hardware and software that performs off-hook detection to determine if subscriber 12 desires data service and couples a modem 60 to subscriber line 16 upon detecting a need for data service from a computer 32 of subscriber 12. Controller 62 also tracks subscriber usage, monitors subscriber information and generates billing and demographic information.

An important advantage of communication server 58 is that modems 60 support determining subscriber line information 28 of subscriber lines 16 while providing data service to subscribers 12, as described in detail below. System management controller 74 polls modems 60 periodically, in response to an external stimulus, or upon an event time-out to collect the subscriber line information 28 for subscriber lines 16 and to communicate it to system management server 18 using links 76 and 20.

Communication server 58 multiplexes modem digital outputs into a multiplexed digital line 66 for delivery to a router or other network device 68. In one embodiment, multiplex digital line 66 carries a single, bidirectional and multiplexed signal for all subscribers 12 of a particular central office 14. Signals on multiplexed digital line 66 may support any appropriate digital protocol used by network device 68. In this regard, communication server 58 and network device 68 may form a portion of a Digital Subscriber Link Access Multiplexer (DSLAM) 69 at central office 14. A communication network 70, such as a global communication network like the Internet, is coupled to network device 68. Communication network 70 may also include a synchronous optical network (SONET), a frame relay network, an Asynchronous Transfer Mode (ATM) network, a T1, T3, E1, or E3 network, or any other suitable communication network.

System interface controller 74 comprises any suitable system controller card at DSLAM 69 that supports simple network management protocol (SNMP), or any other suitable protocol that communicates data to system management server 18 using link 20 and any suitable in-band or out-of-band signaling techniques. In particular, system interface controller 74 communicates to server 18 as SNMP variables the subscriber line information 28 extracted from various components of system 10, such as from modem 60. Line 20 comprises any suitable switched or dedicated communication path that supports communication between controller 74 and server 18 using SNMP, or any other suitable protocol. Although controller 74 is illustrated in FIG. 1 integrated into DSLAM 69 at central office 14, it should be understood that one or more controllers 74 may alternatively be integrated into and managed by server 18 on behalf of one or more central offices 14. In this regard, server 18 may collect subscriber line information 28 from a number of central offices 14 in communication system 10.

Database management server 72 may comprise any suitable computing platform operating database management software that generally stores, updates, and retrieves information. The database management software may be used to access several different databases stored locally or remotely for different purposes within central office 14. In one embodiment, the database management server 72 of a particular central office 14 maintains in system management database 22 a portion of subscriber line information 28. Typically, this information includes a subscriber line identifier, the length of the subscriber line, the gauge of twisted pair wiring used for the subscriber line, and the number and type of disturbers associated with the subscriber line 16. In one embodiment, this information may be stored arranged according to the different binder group segments 46 of each subscriber line 16. The database management software operating on server 72 manages the security and user access of the stored information on behalf of central office 14. A user with proper security clearance may access server 72 and database 22 to store, update, or retrieve the above-identified subscriber line information 28.

System management server 18 comprises any suitable computing platform 100 operating a system management application 102. Computing platform 100 includes a processor 104 coupled to one or more output devices 106, such as a display or speaker, and one or more input devices 108, such as a keyboard or mouse. Platform 100 also includes a communication interface 110, such as the appropriate hardware (e.g., one or more modems, terminal adapters, or network interface cards) and software (e.g., protocol conversion and data processing software) to communicate with modems 60 using interface controller 74. Platform 100 also includes memory 112 that stores application 102 and any associated files, tables, or buffers, in RAM, ROM, CD-ROM, or any other form of magnetic or optical storage.

Application 102 comprises a set or collection of instructions, procedures, and/or related data adapted for implementation in a suitable computer language such as, for example, C, C++, or any other suitable development language. Application 102 may be a stand-alone application or delivered integral to or with other system management software. In general, application 102 determines the optimal transmit power spectrum density of modems 60 and 42. Application 102 also determines the appropriate communication protocol to use for a modem 60 or 42 providing data services to a subscriber 12. Application 102 further determines the approximate data rate capacity 80 and 82 of subscriber lines 16.

System management database 22 comprises any suitable form of memory arranged, for example, as a data storage facility or a data warehouse that provides a consistent, updated, and integrated view of subscriber line information 28 and communication device information 29 gathered by central offices 14 and system management server 18 of system 10. Information 28 and 29 may be stored in files, tables, charts, matrices, or in any other suitable organization of data that is readily accessible by server 18 and central offices 14. Server 18 and database 22 may be referred to collectively as a communication facility.

Subscriber line information 28 comprises information defining the physical and operational characteristics of subscriber lines 16 in system 10. Information defining the physical characteristics of subscriber lines 16 includes a subscriber line identifier, the length of each subscriber line 16, the number and arrangement of binder group segments 46 for each subscriber line 16, the gauge of twisted pair wiring used in each binder group segment 46 of subscriber line 16, the number and type of disturbers for each binder group segment 46 of subscriber line 16, cross-channel coupling information for subscriber lines 16, or any other information defining the physical characteristics of subscriber lines 16. The information defining the physical characteristics of subscriber line 16 may be maintained by either system management server 18 or by the database management server 72 of each central office 14 in system 10.

The information defining the operational characteristics of subscriber lines 16 includes attenuation information and noise information for subscriber lines 16 of system 10. The attenuation information and noise information may be determined as a function of the information defining the physical characteristics of subscriber lines 16 by performing attenuation estimation and noise estimation algorithms. Alternatively, the attenuation information and the noise information of a particular subscriber line 16 may be determined based upon information acquired by the appropriate modem pairs (e.g., a modem 60 at central office 14 and a modem 42 at subscriber 12 ) over a statistically significant period of time, as described in greater detail below.

Communication device information 29 comprises information defining the physical characteristics of communication devices in system 10 such as the number and type of modems 60 available for use, and the type of communication protocols supported by modems 60. Information 29 further comprises information defining the operational characteristics of communication devices in system 10, such as the number of times a particular modem 60 fails to communicate with a particular modem 42 using a particular subscriber line 16 and a particular communication protocol. Communication device information 29 is described in greater detail with reference to FIG. 4.

Communication system 10 supports data service over subscriber lines 16 using asymmetric digital subscriber line (ADSL), symmetric digital subscriber line (SDSL), high speed digital subscriber line (HDSL), very high speed digital subscriber line (VDSL), or any other suitable xDSL communication protocols that allows high rate data service over twisted pair wiring. Each of these xDSL communication protocols provides data service using existing subscriber lines 16 without interrupting normal telephone service. This is accomplished, for example, by a separation technique, such as frequency division multiplexing (FDM) or echo cancellation, to separate frequencies that provide telephone service from those frequencies that provide data service. Dynamic noise cancellation techniques and a guard band between the data and phone service frequencies ensure reliable and simultaneous access to data and phone service over subscriber line 16. For example, subscriber 12 may simultaneously engage in both a data communication session using computer 32 and a voice conversation using telephone 30.

In one embodiment, subscriber line 16 and components of subscriber 12 and central office 14 support communication using ADSL techniques that comply with ANSI Standard T1.413, such as discrete multi tone (DMT) modulation. In another embodiment, ADSL communication may be performed using carrier-less amplitude modulation (CAP). In an ADSL communication system, the downlink data rate 80 from central office 14 to subscriber 12 is greater than the uplink data rate 82 from subscriber 12 to central office 14. This allows high bandwidth communication to subscriber 12, while still providing lower bandwidth communication to central office 14. ADSL communication is well adapted for applications, such as video-on-demand, multi-media, and Internet access, that transfers large volumes of information to subscriber 12 in response to shorter requests for information. Although portions of the following description of the operation of system 10 are detailed in terms of communication using ADSL techniques, it should be understood that the features and functions of system 10 also apply to the other xDSL communication protocols discussed above.

In operation, communication system 10 generally provides phone and data services to those subscribers 12 having the proper communication equipment at the subscriber premises. To access data services, in particular, a subscriber 12 operates a modem 42 that exchanges data with a modem 60 of a central office 14 using any suitable communication protocol.

The provisioning of data services to a new subscriber 12 over a subscriber line 16 in a particular binder group 45 may contribute to the noise and distortion upon other subscriber lines 16 within the same binder group 45, thereby degrading the services already provided to other subscribers 12. Therefore, a central office 14 may endeavor to provide data services to a new subscriber 12 that does not degrade the services provided to other subscribers 12 by determining an optimal transmit power spectrum density of modems 60 and 42 operating on subscriber lines 16 for new subscribers 12 and by selecting the communication protocol that is best adapted to provide the determined power spectrum density.

Because the downlink data rate 80 and uplink data rate 82 of a particular subscriber line 16 varies depending on the specific communication protocol employed, the quality and length of the subscriber line 16, and the contribution of noise and distortion from disturbers within system 10, a new subscriber 12 may request from a central office. 14 approximations for data rates 80 and 82 supported by the subscriber line 16 before activating modem 42. In some cases, central offices 14 provide inaccurate estimations of data rates 80 and 82. In other cases central offices 14 must perform a "truck roll"—the dispatch of a service technician to activate a modem 42 or to configure a subscriber line 16—prior to determining data rates 80 and 82. This may be time consuming and cost prohibitive for central offices 14 and subscribers 12.

The system management server 18 of system 10 supports determining and controlling the power spectrum density of modems 60 and 42, and determining data rate capacity 80 and 82 for a particular subscriber line 16 using subscriber line information 28 stored in system management database 22. In particular, system management server 18 extracts subscriber line information 28 from various components of system 10, such as modems 60 of central offices 14; processes information 28 for storage in system database 22; and accesses selected subscriber line information 28 stored in database 22 to determine the appropriate power spectrum density of modems 60 and 42 and the approximate data rate capacity 80 and 82 of subscriber lines 16. In this regard, server 18 manages the various components of system 10.

In addition to storing subscriber line information 28 collected by database management servers 72 of central offices 14, system management database 22 stores information 28 processed by system management server 18, such as attenuation information and noise information. Server 18 extracts subscriber line information 28 from various components of system 10, such as modems 60 of communication server 58, using system interface controller 74.

Modems 60 may collect information defining the operational characteristics of subscriber lines 16 while providing data services to subscribers 12. This process of gathering subscriber line information 28 is referred to as "modem training," and generally occurs during the normal course of operation of system 10. Although the following description of modem training is detailed with reference to ADSL modems that employ discrete multi-tone (DMT) modulation technology, it should be understood that other types of modems employing other modulation technology may gather information defining the operational characteristics of a subscriber line 16 using suitable techniques. Therefore, one of skill in the art can appreciate that the transmit power spectrum density and data rate determination features and functions performed by server 18 are not limited to any particular type of communication protocol or modulation technology.

ADSL modems 60 increase the amount of data that the conventional twisted-pair subscriber lines 16 can carry by using DMT technology to divide the bandwidth of a subscriber line 16, generally referred to as the frequency spectrum supported by a subscriber line 16, into many individual sub-bands or channels. Each channel of a subscriber line 16 uses a form of quadrature amplitude modulation (QAM) to transmit data in each channel simultaneously. For example, the 1.1 MHz frequency spectrum of a conventional twisted pair subscriber line 16 may be divided such that the lower 4 kHz is reserved for use by POTS and is generally referred to as the voice frequency spectrum. The frequency range from 25 kHz to 1.1 MHz, generally referred to as the data frequency spectrum, is divided into sub-frequencies. Each sub-frequency is an independent channel and supports transmission of its own stream of data signals. DMT technology is very useful for ADSL technology where the sub-channels are divided into groups and one group of channels is allocated for the uplink transmission of data and the other for the downlink transmission of data.

During modem training, an ADSL modem 60 employing DMT modulation technology may collect subscriber line information 28 used to determine attenuation information and noise information for each channel of the data frequency spectrum for a particular subscriber line 16. To collect subscriber line information 28 for subscriber line 16 during the downlink transmission of data, for example, modem 60 transmits a data signal at a known transmit power spectrum density, $Q_f$, for each channel of the data frequency spectrum allocated for downlink transmission. Modem 42 measures the received signal power spectrum density, $S_f$, of the received data signal for each downlink channel and communicates this and other subscriber line information 28 to modem 60.

In some situations, modems 60 and 42 may not establish a connection over the entire frequency spectrum of a subscriber line 16. Rather, the modems 60 and 42 may only connect over a subrange of frequencies. In these instances where a modem 60 fails to operate over the entire frequency spectrum supported by a subscriber line 16, central office 14 may enter a modem 60 into a diagnostic mode. In the diagnostic mode, a modem 60 communicates to modem 42 a signal pulse at a known transmit power spectrum density, $Q_f$, for one or more sub-frequencies within the frequency spectrum over which the modems 60 and 42 may still connect, such as over a sub-frequency in the voice frequency spectrum.

Modem 42 at subscriber premises 12 receives the data signal that is communicated by modem 60 and determines subscriber line information 28, such as attenuation information, noise information, received signal power spectrum density, $S_f$, or any other information describing the physical or operating characteristics of subscriber line 16 at the one or more sub-frequencies over which the connection between modem 60 and 42 is established. Modem 42 then extrapolates subscriber line information 28 for all frequencies in the frequency spectrum supported by subscriber line 16 and communicates the determined subscriber line information 28 to central office 14 over any achievable range of sub-frequencies using any suitable communication protocols, such as, for example, over a sub-frequency in the voice frequency spectrum using the V.90 communication protocol.

In those instances where modems 60 and 42 fail to establish a connection using a particular communication protocol, such as an xDSL communication protocol, server 18 may initiate the operation of modem 60 using an alternative communication protocol. For example, if the number of times a modem 60 fails an attempt to communicate with a modem 42 using a first communication protocol exceeds a predetermined threshold, then server 18 initiates the operation of the particular modem 60 using an alternative communication protocol supported by the particular subscriber line 16. This aspect of operation of system 10 is described in further detail with respect to FIGS. 4 and 8.

Upon an event time-out, after a suitable period of time, in response to instructions from system management server 18, or before modem 60 operates on another subscriber line 16, system interface controller 74 extracts from modem 60 subscriber line information 28, such as the transmit power spectrum density, $Q_f$, and the received signal power spectrum density, $S_f$, measurements for each channel of each subscriber line 16 upon which the modem 60 operated, and communicates this information 28 to server 18 for further processing.

Server 18 then determines the attenuation information and noise information for subscriber lines 16. In particular, the transfer function of a subscriber line 16 at any particular sub-frequency of communication, such as frequencies supported by subscriber line 16 for downlink or uplink transmission of data, is generally referred to as attenuation information and may be modeled by the following equation:

$$|H_f| = \sqrt{\frac{S_f}{Q_f}}$$

where:

$H_f$ = attenuation information for subscriber line 16 at sub-frequency ($f$);

$Q_f$ = power spectrum density of a signal transmitted at sub-frequency($f$); and $S_f$ = power spectrum density of the signal received at sub-frequency ($f$).

The loop insertion loss for any particular sub-frequency may then be modeled by the following equation:

Insertion loss$_{dB}$=−20 log$_{10}$(|$H_f$|)

where:

|$H_f$| = attenuation information for subscriber line 16 at sub-frequency ($f$).

Therefore, the attenuation information of subscriber line 16 at sub-frequencies supporting the downlink transmission of data may be obtained by measuring the power spectrum density, $Q_f$, of a signal transmitted by modem 60, and the power spectrum density, $S_f$, of the signal received by modem 42, and performing the appropriate attenuation information modeling techniques as described above. Similarly, the attenuation information of subscriber line 16 at sub-frequencies supporting the uplink transmission of data may be obtained by measuring the power spectrum density, $Q_f$, of a signal transmitted by modem 42, and the power spectrum density, $S_f$, of the signal received by modem 60, and performing the appropriate attenuation information modeling techniques as described above.

The noise information for a particular subscriber line 16 may be determined by measuring noise characteristics of a subscriber line 16 during operation or by calculating the noise information using subscriber line information 28 for subscriber line 16. For example, a modem 42 of a subscriber 12 may operate as a spectrum analyzer during operation to sample a time domain signal communicated by central office 14 using subscriber line 16. Modem 42, operating as a spectrum analyzer, measures the noise variance of the time domain signal over a statistically significant period of time and converts the measured noise variance from the time domain to the frequency domain by performing, for example, a Fast Fourier Transform.

If modem 42 is not subscribed to receive data services from central office 14, then modem 42 may communicate the measured noise information, such as the noise variance for the signal determined for the frequency domain, to central office 14 over any suitable range of sub-frequencies using any suitable communication protocol, such as, for example, over a sub-frequency in the voice frequency spectrum using the V.90 communication protocol. If modem 42 is subscribed to receive data services from central office 14, then modem 42 may communicate the measured noise information to modems 60 of central office 14 using any suitable communication protocol and frequencies supported by subscriber lines 16.

The noise information for any particular subscriber line 16 may alternatively be calculated using subscriber line information 28. The electrical energy transmitted across a subscriber line 16 as a modulated signal also radiates energy onto adjacent subscriber lines 16 located in the same binder group 45. This cross-coupling of electromagnetic energy is called cross-talk. In communication system 10, adjacent subscriber lines 16 within a binder group 45 that transmit or receive information in the same range of frequencies can create significant cross-talk interference. This is because cross-talk-induced signals combine with the signals which were originally intended for transmission over subscriber line 16 and results in a slightly different shaped waveform than was originally transmitted. Cross-talk can be categorized in one of two forms. Near End cross-talk, commonly referred to as NEXT, is the most significant form of cross-talk because the high energy signal from an adjacent system can induce relatively significant cross-talk into the primary signal. The other form of cross-talk is Far End cross-talk, or FEXT. FEXT is typically less of an issue because the far end interfering signal is attenuated as it traverses subscriber line 16.

Using subscriber line information 28 regarding the number and types of cross-talk creating components, generally referred to as disturbers, in the binder group 45 to which the particular subscriber line 16 belongs and their transmit power spectrum density, the noise caused by Near End cross-talk upon subscriber line 16 may be modeled by the following equation:

$$n_f(NEXT) = \left(\frac{N}{49}\right)^{.6} \frac{(Q_f)(f^{3/2})}{1.134 \times 10^{13}}$$

where:

$n_f(NEXT)$ = noise caused by NEXT upon subcriber line 16 at sub-frequency $(f)$;

$N$ = number of disturbers of a particular type;

$Q_f$ = transmit power spectrum density of disturbers at sub-frequency $(f)$; and $f$ = sub-frequency of communication If multiple types of disturbers (e.g., HDSL, ADSL, SDSL, ISDN, T1, E1, etc.) exist within binder group 45 of subscriber line 16, then the noise created upon subscriber line 16 by the total number of disturbers may be determined as the summation of the noise contributions upon subscriber line 16 by each type of disturber, as modeled by the following equation:

$$n_f(NEXT) = n_f(NEXT_{HDSL}) + n_f(NEXT_{SDSL}) + n_f(NEXT_{ADSL}) + n_f(NEXT_{IDSN}) + \ldots + n_f(NEXT_{T1}).$$

The noise caused by Far End cross-talk upon subscriber line 16 may be modeled by the following equation:

$$n_f(FEXT) = \left(\frac{N}{49}\right)^{.6} kdf^2(|H_f|^2)Q_f$$

where:

$n_f(FEXT)$ = noise caused by FEXT upon subcriber line 16 at sub-frequency $(f)$;

$N$ = number of disturbers of a particular type;

$k = 8 \times 10^{-20}$;

$d$ = length of subscriber line 16 measured in feet;

$|H_f|$ = attenuation information for subscriber line 16 at sub-frequency $(f)$;

$Q_f$ = transmit power spectrum density of disturbers at sub-frequency $(f)$; and $f$ = sub-frequency of communication Again, if multiple types of disturbers exist within the relevant binder group of subscriber line 16, then the noise created by Far End cross-talk upon subscriber line 16 by the total number of disturbers may be determined as the summation of the noise contributions upon subscriber line 16 by each type of disturber, as modeled by the following equation:

$$n_f(NEXT) = n_f(FEXT_{HDSL}) + n_f(FEXT_{SDSL}) + n_f(FEXT_{ADSL}) + n_f(FEXT_{IDSN}) + \ldots + n_f(FEXT_{T1}).$$

Therefore, the total noise created by Near End cross-talk and Far End cross-talk upon subscriber line 16 may be modeled by the following equation:

$$N_f = n_f(NEXT) + n_f(FEXT)$$

However, because the far end interfering signal is attenuated as it traverses subscriber line 16, the contributions to noise upon subscriber line 16 by FEXT are negligible as compared to those of NEXT.

System management server 18 updates subscriber line information 28 stored in database 22 with the determined attenuation information and noise information for subscriber lines 16. By determining attenuation information and noise information for subscriber lines 16 over a statistically significant period of time, server 18 maintains the integrity of subscriber line information 28 stored in database 22. System management server 18 may determine and database 22 may store subscriber line information 28 according to a particular subscriber line 16 or the different binder group segments 46 of the particular subscriber line 16.

System management server 18 determines the transmit power spectrum density, $Q_f$, of a modem 60 or 42 operating on a particular subscriber line 16 using subscriber line information 28 stored in database 22. Server 18 then determines the communication protocol that is best adapted to provide the determined transmit power spectrum density of modem 60 or 42. The transmit power spectrum density for a modem 60 or 42 operating on a particular subscriber line 16 may be modeled by the following equation to minimize the effect of the interference caused by the subscriber line 16 upon other subscriber lines 16 within the same binder group 45:

$$Q_f = \frac{n_f}{\hat{x}_f}$$

where:

$Q_f$=transmit power spectrum density;

$n_f$=noise caused by disturbers of system upon the particular subscriber line 16; and $$\hat{x}_f = \left(\frac{1}{49}\right)^6 \frac{f^{3/2}}{1.134 \times 10^{13}}$$

Server 18 determines the communication protocol that is best adapted to provide the determined transmit power spectrum density of modem 60 or 42 for the frequency spectrum supported by subscriber line 16. For example, server 18 may determine that ADSL technology is appropriate to provide a transmit power spectrum density that is substantially low from 0 kHz to 128 kHz and that is substantially high from 129 kHz to 1.1 MHz. Server 18 may determine that VDSL technology is appropriate to provide a transmit power spectrum density that is substantially high from 0 kHz to 128 kHz and that is substantially low from 129 kHz to 1.1 MHz. Server 18 may determine that SDSL technology is appropriate to provide a transmit power spectrum density that is substantially high throughout the frequency spectrum from 0 kHz to 1.1 MHz. Server 18 may determine that any type of xDSL technology is appropriate to provide a transmit power spectrum density that is substantially low throughout the frequency spectrum from 0 kHz to 1.1 MHz.

System management server 18 determines the approximate uplink and downlink data rate capacity 80 or 82 of a selected subscriber line 16 using subscriber line information 28 stored in database 22. In one embodiment, server 18 determines data rate capacity 80 or 82 of a selected subscriber line 16 using the determined transmit power spectrum density of a modem 42 or 60 operating on the subscriber line 16. Server 18 retrieves subscriber line information 28 from database 22, such as the appropriate attenuation information and noise information, according to the selected subscriber line 16, a representative subscriber line 16, or the constituent binder group segments 46 of the selected subscriber line 16.

Server 18 retrieves attenuation information for the selected subscriber line 16 using one of two methods. According to a first method, server 18 searches subscriber line information 28 to locate another subscriber line 16 having each of the same binder group segments 46 as the selected subscriber line 16. Such a subscriber line 16 is generally referred to as a representative subscriber line 16. If server 18 locates a representative subscriber line 16, then it retrieves the attenuation information for the representative subscriber line 16 for determination of the data rate capacity 80 or 82 of the selected subscriber line 16, as described in detail below.

According to a second method to retrieve attenuation information, server 18 searches subscriber line information 28 to locate each individual binder group segment 46 of the selected subscriber line 16. Each of the individual binder group segments 46 of the selected subscriber line 16 is generally referred to as a representative binder group segment 46 and may be located in database 22 associated with one or more subscriber lines 16. Server 18 identifies the attenuation information for each representative binder group segment 46 and associates each of their individual attenuation contributions for each downlink and uplink channel of transmission to determine the approximate total attenuation information for each channel of the selected subscriber line 16.

Server 18 also retrieves noise information for the selected subscriber line 16 using one of two methods. According to a first method, server 18 retrieves the noise information stored in database 22 for the selected subscriber line 16 itself. According to a second method, server 18 searches subscriber line information 28 to locate another subscriber line 16 having each of the same binder group segments 46 as the selected subscriber line 16. If server 18 locates such a representative subscriber line 16, then it retrieves the noise information for the representative subscriber line 16 for determination of the data rate capacity 80 or 82 of the selected subscriber line 16 as described in detail below.

The noise information for the selected subscriber line 16 or for the representative subscriber line 16 may have been collected by a modem 42 operating as a spectrum analyzer and communicated to central office 14, as described above. Alternatively, the noise information for the selected subscriber line 16 or for the representative subscriber line 16 may have been calculated according to the equations for Near End cross-talk and Far End cross-talk modeled above.

Using the determined attenuation information and noise information, server 18 determines the signal-to-noise ratio of a signal communicated by modem 60 or 42 over subscriber line 16 at a particular sub-frequency, according to the following equation:

$$SNR_f = \frac{(Q_f)(|H_f|^2)}{n_f}$$

where:

$SNR_f$=signal to noise ratio of signal;

$Q_f$=transmit power spectrum density at sub-frequency (f);

$|H_f|$=attenuation information for subscriber line 16 at sub-frequency (f); and $n_f$=noise information for subscriber line 16 at sub-frequency (f).

Therefore, server 18 may determine the signal-to-noise ratio of a data signal communicated by modem 42 over subscriber line 16 by using the transmit power spectrum density, $Q_f$, of modem 42, the attenuation information for subscriber line 16, $|H_f|$, and the noise information for subscriber line 16, $n_f$, at sub-frequencies supporting the uplink transmission of data. Similarly, server 18 may determine the signal-to-noise ratio of a data signal communicated by modem 60 over subscriber line 16 by using the transmit power spectrum density, $Q_f$, of modem 60, the attenuation information for subscriber line 16, $|H_f|$, and the noise information for subscriber line 16, $n_f$, at sub-frequencies supporting the downlink transmission of data.

The uplink data rate capacity 82 is a measure of the amount of data bits that may be transmitted by subscriber line 16 from subscriber 12 to central office 14 as a function of time, and may be modeled by the following equation:

$$R = \frac{1}{T}\sum_{f=f_1}^{f_2} \log_2\left[1 + \frac{SNR_f}{9.55}\right]$$

where:

$R$ = uplink data rate capacity 82;

$\frac{1}{T}$ = baud rate of modem 42;

$SNR_f$ = signal-to-noise ratio of subscriber line 16 at sub-frequencies supporting the uplink transmission of data;

$f_1$ = low frequency boundary for uplink data frequency spectrum; and $f_2$ = high frequency boundary for uplink data frequency spectrum.

The downlink data rate capacity 80 is a measure of the amount of data bits that may be transmitted by subscriber line 16 from central office 14 to subscriber 12 as a function of time, and may be modeled by the following equation:

$$R = \frac{1}{T}\sum_{f=f_3}^{f_4} \log_2\left[1 + \frac{SNR_f}{9.55}\right]$$

where:

$R$ = downlink data rate capacity 80;

$\frac{1}{T}$ = baud rate of modem 60;

$SNR_f$ = signal-to-noise ratio of subscriber line 16 at sub-frequencies supporting the downlink transmission of data;

$f_3$ = low frequency boundary for downlink data frequency spectrum; and $f_4$ = high frequency boundary for downlink data frequency spectrum.

Figures 2, 4:
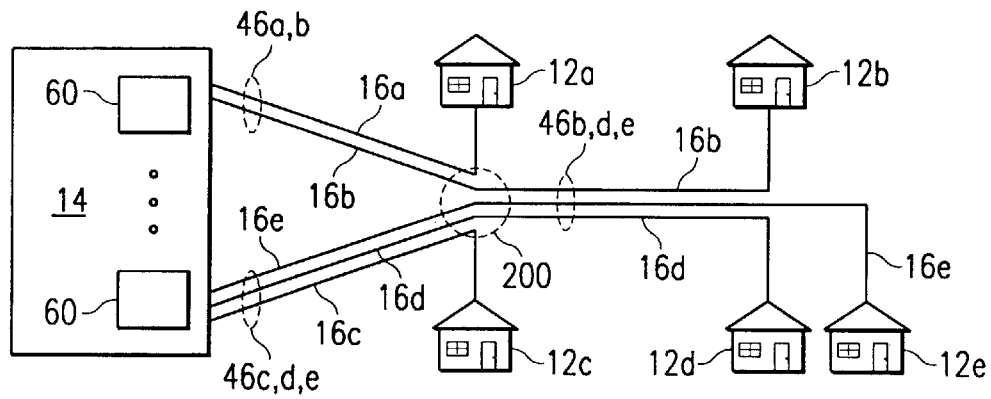
FIG. 2 illustrates one arrangement of subscribers in the communication system.
FIG. 4 illustrates one example of communication device information stored in a database of the communication system.

FIG. 2 illustrates an exemplary arrangement of subscriber lines 16 comprising different binder group segments 46 in system 10. Generally, a binder group segment 46 is a collection of subscriber lines 16 that share a common "sheath". A particular subscriber line 16 may extend from central office 14 to a subscriber 12 through a number of different binder group segments 46. The provisioning of data services to a new subscriber 12 over a subscriber line 16 in a particular binder group segment 46 may contribute to the noise and distortion upon other subscriber lines 16 within the same binder group segment 46, thereby degrading the services already provided to other subscribers 12. Therefore, a central office 14 may endeavor to provide data services to a new subscriber 12 that does not degrade the services provided to other subscribers 12 by determining an optimal transmit power spectrum density of modems 60 and 42 operating on subscriber lines 16 for new subscribers 12 and by selecting the communication protocol that is best adapted to provide the determined power spectrum density.

Although the following description of FIG. 2 details the determination of a power spectrum density for a modem 60 operating on a subscriber line 16d for a new subscriber 12d, it should be understood that the following determination of a transmit power spectrum density may apply for either modem 60 or 42 and for any subscriber 12. The cross-talk caused by subscriber line 16d upon subscriber lines 16 sharing a common binder group segment 46, such as subscriber lines 16c and 16e of binder group segments 46cde and 46bde, will degrade the data services offered to subscribers 12c and 12e unless the noise contributed by subscriber line 16 of subscriber 12 is maintained below a determined "noise floor."

The signal-to-noise-interference ratio for subscriber lines 16c and 16e may be modeled by the following equations:

$$SNIR_c = \frac{Q_c(H_c^2)}{n_c + X_{e,c} + X_{d,c}}$$

where:

$X_{e,c} = Q_c \hat{x}_{e,c}$;

$X_{d,c} = Q_c \hat{x}_{d,c}$; and $n_c$ = noise information for subscriber line 16c.

$$SNIR_e = \frac{Q_e(H_e^2)}{n_e + X_{c,e} + X_{d,e}}$$

where:

$X_{c,e} = Q_e \hat{x}_{c,e}$;

$X_{d,e} = Q_e \hat{x}_{d,e}$; and $n_e$ = noise information for subscriber line 16e.

Because the contribution of noise to subscriber line 16c by subscriber line 16d for new subscriber 12d comprises $X_{d,c}$, the transmit power spectrum density, Q, of a modem 60 or 42 operating on subscriber line 16d is controlled such that $Q_c \hat{x}_{d,c} \leq n_c$ so that $X_{d,c}$ does not substantially affect $SNIR_c$. Similarly, because the contribution of noise to subscriber line 16e by subscriber line 16d comprises $X_{d,e}$, the transmit power spectrum density, Q, of a modem 60 or 42 operating on subscriber line 16d is controlled such that $Q_e \hat{x}_{d,e} \leq n_e$ so that $X_{d,e}$ does not substantially affect $SNIR_e$. In this respect, the optimal transmit power spectrum density of a modem 60 or 42 operating on subscriber line 16d may be determined using the noise information of subscriber lines 16c and 16e as a "noise floor." For example, the lowest noise information of subscriber lines 16c and 16e may be used as the "noise floor" in the transmit power spectrum density determination.

Alternatively, the optimal transmit power spectrum density of a modem 60 or 42 operating on subscriber line 16d may be determined using the noise information of the subscriber line 16 for the new subscriber 12, such as subscriber line 16d of new subscriber 12d, as a "noise floor." In particular, because the cross-channel coupling, $\hat{x}$, caused by subscriber line 16d upon either subscriber line 16c or 16e is substantially similar to the cross-channel coupling, $\hat{x}$, caused by subscriber lines 16c and 16e upon subscriber line 16d, respectively, the contribution of noise by subscriber line 16d upon subscriber lines 16c and 16e may be minimized by controlling the transmit power spectrum density of a modem 60 or 42 operating on subscriber line 16d such that $$Q_d \hat{x} \leq n_d$$

where:

$$\hat{x} = \left(\frac{1}{49}\right)^{.6} \cdot \frac{f^{3/2}}{1.134 \times 10^{13}}.$$

Alternatively, $\hat{x}$ may be measured for subscriber lines 16.

Therefore, the optimal transmit power spectrum density for a modem 60 operating on subscriber line 16d may be modeled by the following equation:

$$Q_f = \frac{n_f}{\left(\frac{1}{49}\right)^{.6} \frac{f^{3/2}}{1.134 \times 10^{13}}}$$

where:

$Q_f$ = determined transmit power spectrum density of modem 60 or 42 operating on subscriber line 16 for subscriber 12 at sub-frequency (f);

$n_f$ = noise information for subscriber line 16 at sub-frequency (f); and $f$ = sub-frequency of communication Referring back to FIG. 2, subscriber lines 16 that do not share each of the same binder group segments 46 as each other may exhibit different physical and operational characteristics. Even subscribers 12 that are in near proximity to each other, such as in the same residential neighborhood or in the same business development, may be coupled to central office 14 using subscriber lines 16 that do not share each of the same binder group segments 46.

Different subscriber lines 16 may extend from central office 14 and ultimately reach the substantially same destination, such as the same residential neighborhood of subscribers 12, but may traverse different distances to reach their destinations. In this regard, the lengths of subscriber lines 16 in different binder group segments 46 may differ although they service the same general population of subscribers 12. The gauge of twisted pair wiring used for a particular subscriber line 16 may also vary between binder group segments 46. Therefore, a subscriber line 16 may comprise a first gauge of twisted pair wiring, such as twenty-four gauge wiring, for the length of a first binder group segment 46, and a second gauge of twisted pair wiring, such as twenty-six gauge wiring, for the length of a second binder group segment 46. Moreover, the number and type of noise and interference producing elements may vary among binder group segments 46. Subscriber lines 16 sharing the same binder group segment 46 may share the same noise information for that length of segment 46. Subscriber lines 16 not sharing the same binder group segments 46 may exhibit different noise characteristics. As a result, the data rate capacity 80 or 82 of subscriber lines 16 may differ depending on their constituent binder group segments 46.

A particular advantage provided by system 10 is the ability to determine the attenuation characteristics of individual binder group segments 46 of subscriber lines 16. System management server 18 may then determine the attenuation information of a selected subscriber line 16 according to the attenuation characteristics contributed by each of its constituent binder group segments 46. By determining attenuation information of a selected subscriber line 16 according to each of its constituent binder group segments 46, server 18 may more accurately determine the data rate capacity 80 or 82 of a selected subscriber line 16.

Referring in particular to the arrangement of subscriber lines 16 illustrated in FIG. 2, each of subscribers 12a–12e, collectively referred to as subscribers 12, are coupled to central office 14 using subscriber lines 16a–16e, collectively referred to as subscriber lines 16, respectively. Subscriber lines 16a and 16b share a common binder group segment 46ab. Subscriber lines 16b, 16d, and 16e share a common binder group segment 46bde. Subscriber lines 16c, 16d, and 16e share a common binder group segment 46cde.

The attenuation information for each subscriber line 16 at each particular sub-frequency of transmission comprises a combination of the attenuation information for its constituent binder group segments 46. In particular, the attenuation information, $|h_f|$, of a selected subscriber line 16 at a particular sub-frequency, f, is determined by multiplying together in the frequency domain the attenuation information, $|H_f|$, for each of the constituent binder group segments 46 of the selected subscriber line 16. For example, the attenuation information, $|H_f|$, for subscriber line 16b comprises the attenuation information, $|H_f|$, for that segment of line 16b in binder group 46ab multiplied in the frequency domain by the attenuation information, $|H_f|$, for that segment of line 16b in binder group 46bde. Similarly, the attenuation information for subscriber lines 16d and 16e may be determined using the attenuation information, $|H_f|$, for those segments of lines 16d and 16e in binder groups 46de and 46bde, as described above.

The attenuation information of subscriber lines 16 in binder group segment 46ab may be different from that of the subscriber lines 16 in binder group segment 46cde due to the different length or gauge of twisted pair wiring used in binder groups 46ab and 46cde. Therefore, although the attenuation information of subscriber lines 16b and 16d may be similar for those segments of subscriber lines 16b and 16d in common binder group 46bde, the overall attenuation information for subscriber lines 16b and 16d may differ due to differences in the physical and operational characteristics of subscriber lines 16 in binder group segments 46ab and 46cde. Conversely, the attenuation characteristics of subscriber lines 16d and 16e may be substantially similar since both share the same binder group segments 46cde and 46bde. Subscriber lines 16d and 16e therefore comprise representative subscriber lines 16 for each other.

The following description of FIG. 2 details the determination of data rate capacity 80 and 82 of subscriber line 16d for new subscriber 12d using, in a first method, the attenuation information of a representative subscriber line 16e and, in a second method, the attenuation information for representative binder group segments 46cde and 46bde.

According to the first method, if subscriber line 16e receives data services from central office 14, then server 18 determines the attenuation and noise information of subscriber line 16e based upon information collected by modems 60 during training, as described above. Database 22 stores this subscriber line information 28 for subscriber line 16e. To determine the data rate capacity 80 or 82 of subscriber line 16d, system management server 18 accesses subscriber line information 28 in database 22 and determines that subscriber lines 16d and 16e share binder group segments 46cde and 46bde. Since subscriber lines 16 that share the same binder group segments 46 generally exhibit the same physical and operational characteristics, the attenuation and noise information stored for subscriber line 16e is representative of subscriber line 16d. In this regard, system management server 18 may determine the data rate capacity 80 or 82 of subscriber line 16d using the attenuation and noise information stored in database 22 for representative subscriber line 16e. This method of determining data rate capacity 80 or 82 of subscriber line 16d is particularly advantageous when a statistically significant number of representative subscriber lines 16 exist.

In those instances where a representative subscriber line 16 does not exist for subscriber line 16d, such as in a new residential neighborhood or business development center where subscribers 12 have not yet requested data services from central office 14, system management server 18 determines data rate capacity 80 or 82 using noise information collected by a modem 42 operating as a spectrum analyzer on subscriber line 16d or calculated according to equations for FEXT and NEXT, as described above, and the attenuation information of its constituent binder group segments 46, as described in detail below. To determine the attenuation information of subscriber line 16d, system management server 18 initially determines that subscriber line 16d comprises binder group segments 46cde and 46bde. The attenuation contribution of subscriber lines 16 in binder group segment 46cde may be combined with that of subscriber lines 16 in binder group segment 46bde to determine the overall attenuation information for subscriber line 16d. In this regard, the breadth of subscriber line information 28 stored in database 22 expands as the population of subscribers 12 receiving data service from central office 14 grows.

The attenuation information for subscriber lines 16 in binder group 46cde may be determined based upon information collected by modems 60 while providing data service to subscriber 12c using subscriber line 16c. To determine the attenuation information of subscriber line 16d, which comprises constituent binder group segments 46cde and 46bde, system management server 18 further determines the attenuation information for that segment of a subscriber line 16 in binder group 46bde. To do this, server 18 uses attenuation information stored in database 22 for subscriber lines 16b and 16a. In particular, server 18 determines the attenuation information for that segment of a subscriber line 16 in binder group 46bde according to the following equations calculated in the frequency domain:

$$|H_f|_{binder\ group\ segment\ 46bde} = \frac{|H_f|_{subscriber\ line\ 16b}}{|H_f|_{subscriber\ line\ 16a}}$$

where:

$|H_f|_{subscriber\ line\ 16b}$ = attenuation information for subscriber line 16b at sub-frequency (f); and $|H_f|_{subscriber\ line\ 16a}$ = attenuation information for subsciber line 16a in binder group segment 46ab at sub-frequency (f).

Therefore, if subscribers 12a, 12b, and 12 c receive data service from central office 14, modems 60 may collect information during training that defines the operational characteristics of subscriber lines 16 in binder group segments 46ab, 46bde, and 46cde. Based on this information, server 18 may determine and database 22 may store attenuation information for binder groups 46cde and 46bde. System management server 18 combines the attenuation information for subscriber lines 16 in binder groups 46cde and 46bde according to the following equation to determine the overall attenuation information of subscriber line 16d:

$$|H_f|_{subscriber\ line\ 16d} = |H_f|_{binder\ group\ segment\ 46cde} \times |H_f|_{binder\ group\ segment\ 46bde}$$

where:

$|H_f|_{binder\ group\ segment\ 46cde}$ = attenuation information for binder group segment 46cde of sub-frequency (f); and $|H_f|_{binder\ group\ segment\ 46bde}$ = attenuation information for binder group segment 46bde at sub-frequency (f).

Server 18 determines the data rate capacity 80 or 82 of subscriber line 16d using the attenuation information of subscriber line 16d determined above. This method for determining the data rate capacity of a subscriber line 16 is particularly advantageous when attenuation information is stored in database 22 for a representative sample of binder group segments 46.

Although the description of FIG. 2 is detailed with reference to determining the attenuation information of subscriber lines 16 in binder group segments 46 based upon information collected by modems 60 during training, it should be understood that this information may also be collected using other methods. A central office 14 may obtain field measurements for attenuation in particular segments of binder groups 46 at pertinent demarcation points in system 10. For example, central office 14 may measure the attenuation characteristics of a subscriber line 16 in either binder group segment 46ab or 46cde at demarcation point 200 using the appropriate field measurement equipment. In this regard, central office 14 may gather subscriber line information 28 for subscriber lines 16 that may not currently support the provisioning of data services. A particular advantage provided by this aspect of system 10 is that system management server 18 may expand the breadth of subscriber line information 28 stored in database 22 even if the population of subscribers 12 receiving data service is small in a particular region of system 10.

Figure 3:
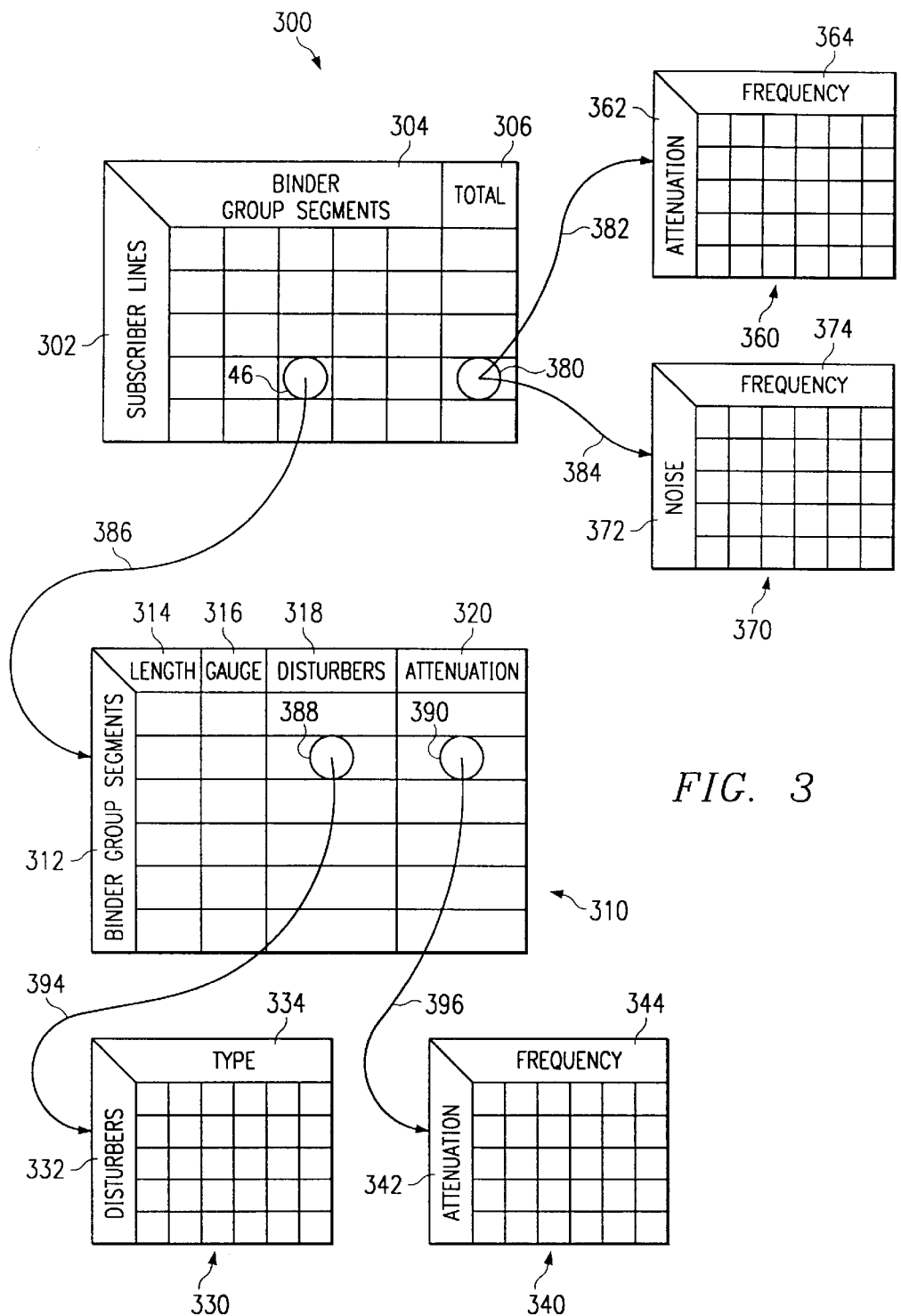
FIG. 3 illustrates one example of subscriber line information stored in a database of the communication system.

FIG. 3 illustrates the structure and content of subscriber line information 28 stored in database 22. The multi-dimensional structure of subscriber line information 28 is represented in FIG. 3 as a cascaded set of two dimensional grids. Subscriber line information 28 may be arranged in subscriber line grid 300, binder groups grid 310, binder group disturbers grid 330, binder group attenuation grid 340, line attenuation grid 360, and line noise grid 370. By maintaining, modifying, and updating the interrelationships and contents of these grids, system management server 18 establishes a relationship between subscriber lines 16, their binder group segments 46, and the attenuation and noise information of subscriber lines 16. Attenuation and noise information for subscriber lines 16 helps determine the data rate capacity 80 or 82 of a selected subscriber line 16, and the optimal transmit power spectrum density of a modem 60 or 42 operating on subscriber line 16.

Subscriber line grid 300 includes a row 302 for each subscriber line 16 in system 10 and a column 304 for each binder group segment 46 of that subscriber line 16. Grid 300 further includes a column 306 to index a row of entries in each of line attenuation grid 360 and line noise grid 370. In general, the information indexed by an entry in column 306 may be used when subscriber line information 28 for the selected subscriber line 16 or a representative subscriber line 16 exists in database 22.

Binder groups grid 310 includes a row 312 for each binder group segment 46 identified in subscriber line grid 300, and a column 314 for the length of that binder group segment 46, a column 316 for the gauge of twisted pair wiring used for that binder group segment 46, a column 318 to index a row of entries in the binder group disturbers grid 330, and a column 320 to index a row of entries in the binder group attenuation grid 340. The combination of subscriber line grid 300 and binder groups grid 310 provides an association between subscriber lines 16, their binder group segments 46, and the subscriber line information 28 defining the physical and operational characteristics of those subscriber lines 16.

Binder group disturbers grid 330 includes a row 332 for each entry in column 318 of binder groups grid 310, and a column 334 indicating the number of each type of disturber found in a particular binder group segment 46. Different types of disturbers include bridged taps, other xDSL services provided by subscriber lines 16 in a common binder group segment 46, radio frequency sources, or any other disturber in system 10. Grid 330 may be updated to reflect the modification of subscriber lines 16 to add or remove those disturbers in communications system 10.

Binder group attenuation grid 340 includes a row 342 for each entry in column 320 of binder groups grid 310, and a column 344 for each sub-frequency at which the attenuation information is determined for a particular binder group segment 46 of a subscriber line 16. The combination of grids 310 and 340 establishes the attenuation information of subscriber lines 16 in binder group segments 46 as a function of frequency. In this regard, grids 310 and 340 support determining the data rate capacity 80 or 82 of a selected subscriber line 16 using attenuation information for its constituent binder group segments 46.

Line attenuation grid 360 includes a row 362 for each entry of column 306 of subscriber line grid 300, and a column 364 for each sub-frequency at which the attenuation information is determined for a particular subscriber line 16. Line noise grid 370 includes a row 372 for each entry of column 306 of subscriber line grid 300, and a column 374 for each sub-frequency at which the noise is determined for a particular subscriber line 16. Generally, the combination of grids 360 and 370 establish the attenuation information and noise information of subscriber lines 16 as a function of frequency. In this regard, grids 360 and 370 support determining the data rate capacity 80 or 82 of a selected subscriber line 16 when subscriber line information 28 for the selected subscriber line 16 or a representative subscriber line 16 exists in database 22.

Now referring to an exemplary arrangement of subscriber line information 28 shown in FIG. 3, a subscriber line 16 represented by row 302 may be identified using a phone number, an address, or some other unique identifier for a subscriber 12 of a particular central office 14. Each subscriber line 16 may comprise a number of binder group segments 46 represented by columns 3.04. Each binder group segment 46 in columns 304 relates to a particular subscriber line 16 and identifies a portion of the physical and operational characteristics of the subscriber line 16 in binder groups grid 310. Each subscriber line 16 also includes a "total line" column 306. Each entry 380 in column 306 relates to a particular subscriber line 16 and identifies attenuation information and noise information for the subscriber line 16 in line attenuation grid 360 and line noise grid 370, respectively.

To determine the data rate capacity 80 or 82 of a selected subscriber line 16, server 18 determines its constituent binder group segments 46 by referring to subscriber line grid 300. Upon determining the constituent binder group segments 46 of the selected subscriber line 16, server 18 determines the data rate capacity 80 or 82 of subscriber line 16 using attenuation information and noise information from grids 310, 330, 340, 360, and 370. For example, server 18 searches for the selected subscriber line 16 or a representative subscriber line 16 in grid 300. A representative subscriber line 16, as described above, is a subscriber line 16 having the same constituent binder group segments 46 as the selected subscriber line 16. Upon locating subscriber line information 28 for the selected subscriber line 16 or for one or more representative subscriber lines 16 in subscriber line grid 300, server 18 uses the appropriate pointers 382 and 384 indicated by entries 380 in column 306 to access the appropriate rows 362 and 372 of line attenuation grid 360 and line noise grid 370, respectively.

Line attenuation grid 360 provides attenuation information for the selected subscriber line 16 or a representative subscriber line 16 at each sub-frequency of bandwidth available for transmission. Similarly, line noise grid 370 provides noise information for the selected subscriber line 16 or a representative subscriber line 16 at each sub-frequency of bandwidth available for transmission. Server 18 may use the attenuation information and noise information provided by grids 360 and 370 to determine the data rate capacity 80 or 82 of the selected subscriber line 16, as discussed above with regard to FIG. 1.

System 10 may also determine attenuation information for a selected subscriber line 16 using the attenuation information of the constituent binder group segments 46. For example, server 18 searches grid 300 for each of the constituent binder group segments 46 which make up the selected subscriber line 16. For each constituent binder group segment 46, server 18 uses the appropriate pointer 386 indicated by binder group segment 46 to identify the appropriate row 312 in binder groups grid 310. Entry 390 of grid 310 indicates rows 342 of binder group attenuation grid 340 using pointer 396. Binder group attenuation grid 340 provides attenuation information for the representative binder group segments 46 at each sub-frequency of bandwidth available for transmission.

Server 18 combines the attenuation information provided by grid 340 at each identified sub-frequency of transmission for each of the constituent binder group segments 46, as described above, to determine the overall attenuation information for the selected subscriber line 16. Server 18 may then use the overall attenuation information to determine the data rate capacity 80 or 82 of the selected subscriber line 16, as described above with reference to FIG. 1.

System 10 may also determine noise information for a selected subscriber line 16 using noise information for the subscriber line 16, such as the number and type of disturbers affecting the selected subscriber line 16. For example, server 18 searches grid 300 for each of the constituent binder group segments 46 which make up the selected subscriber line 16. For each constituent binder group segment 46, server 18 uses the appropriate pointer 386 indicated by binder group segment 46 to identify the appropriate row 312 in binder groups grid 310. Binder group disturbers grid 330 indicates the number and type of disturbers for each representative binder group segment 46 of the selected subscriber line 16. Server 18 may determine the total noise contributions upon selected subscriber line 16 by NEXT and FEXT as modeled by the equations described above. Server 18 may then use the overall noise information to determine the data rate capacity 80 or 82 of the selected subscriber line 16, as described above with reference to FIG. 1. Server 18 may also determine the optimal transmit power spectrum density of a modem 60 operating on subscriber line 16, as described above with reference to FIG. 2, using the noise information stored in database 22.

FIG. 4 illustrates the structure and content of communication device information 29 stored in database 22. Communication device information 29 may be arranged in a communication device grid 400 having a column 402 to index communication devices, such as modems 60 of communication server 58; a column 404 to index the subscriber line 16 upon which a particular modem 60 attempts to operate; a column 406 to index the communication protocol with which the particular modem 60 attempts to operate; and a column 408 to index the number of failed attempts the particular modem 60 has experienced using the subscriber line 16 and the communication protocol identified by columns 404 and 406, respectively.

The communication devices and subscriber lines indexed by columns 402 and 404, respectively, may be identified using any suitable identification or addressing techniques, such as by using telephone numbers. The communication protocol indexed by column 406 may comprise any suitable communication protocol supported by the associated subscriber line 16. Server 18 dynamically updates communication device grid 400 to maintain a current association between a modem 60 and the number of times that the modem 60 fails an attempt to communicate using a particular subscriber line 16 and a particular communication protocol. Because a subscriber line 16 generally identifies a particular communication device, such as a modem 42 residing at a subscriber premises 12, grid 400 also identifies the number of times a modem 60 fails an attempt to communicate with a particular modem 42.

Server 18 may determine that a particular modem 60 cannot establish a connection with a particular modem 42, identified by a subscriber line 16, using a first communication protocol, such as any of the xDSL communication protocols. In these instances, server 18 initiates the operation of modem 60 to communicate with a modem 42 using an alternative communication protocol. For example, modems 60 and 42 may operate using any of the V-series communication protocols, such as the V.90 communication protocol, or using an Integrated Services Digital Network (ISDN) communication protocol. In addition, server 18 may initiate the operation of modems 60 and 42 using a first alternative communication protocol for downlink data communication and a second alternative communication protocol for uplink data communication. For example, server 18 may initiate the operation of modem 60 using the V.90 communication protocol for downlink data communication and using the V.34 communication protocol for uplink data communication. In a particular embodiment, server 18 initiates the operation of modems 60 and 42 over any suitable range of sub-frequencies in the voice frequency spectrum.

Server 18 may determine that the particular modem 60 cannot communicate with a particular modem 42 using a particular communication protocol in a number of ways. For example, server 18 may monitor grid 400 to determine the number of times a particular modem 60 fails an attempt to communicate with a particular modem 42 using a particular communication protocol. If the number of times the modem 60 fails an attempt to communicate with the particular modem 42 exceeds a predetermined threshold, then server 18 initiates the operation of the modem 60 using an alternative communication protocol supported by the particular subscriber line 16. Referring to FIG. 4, for example, if the three failed connection attempts by the modem 60 identified by the telephone number 214-555-2163 exceeds a predetermined threshold established by server 18, then server 18 initiates the operation of that modem 60 for subscriber line 16 identified by the telephone number 214-555-8818 using an alternative communication protocol.

In another example, server 18 may determine that the signal-to-noise-ratio of a subscriber line 16, as determined using techniques described with respect to FIG. 1, fails to exceed a predetermined threshold such that the subscriber line 16 cannot support a particular communication protocol, such as an xDSL communication protocol. In this instance, server 18 may initiate the operation of modem 60 using an alternative communication protocol that may be supported by the particular subscriber line 16. As described above, either excessive noise or attenuation affecting a subscriber line 16 may cause a decrease in the signal-to-noise ratio of a subscriber line 16. If server 18 later determines that the signal-to-noise-ratio of the subscriber line 16 is sufficient to support the previously attempted communication protocol, due to a decrease in noise or attenuation affecting the subscriber line 16, for example, then server 18 may again initiate operation of a modem 60 operating on the particular subscriber line 16 using the previously attempted communication protocol.

In yet another example, server 18 may determine that the modem 42 with which a particular modem 60 is attempting to communicate cannot support communication using a particular communication protocol, such as an xDSL communication protocol. In this instance, server 18 initiates the operation of modem 60 using an alternative communication that is supported by modem 42, such as a V-series communication protocol. Although the determination of whether a modem 60 may establish a connection with a modem 42 has been described with reference to three specific examples, it should be understood that the present invention contemplates initiating the operation of a modem 60 using an alternative communication protocol in response to any determination by server 18 that modem 60 is inoperable to communicate with modem 42 using a first communication protocol.

By determining that a modem 60 is inoperable to communicate with a modem 42 using a first communication protocol and, in response, initiating the operation of modem 60 using an alternative communication protocol, system 10 provides significant technical advantages. First, communication server 58 establishes more reliable connectivity between a modem 60 and a modem 42. Therefore, a subscriber 12 is less likely to suffer a loss of data services. Furthermore, communication server 58 need not maintain a connection with a global-communication-network service provider having an analog communication device coupled to the plain old telephone service (POTS), such as an Internet provider (ISP), in order to provide data services to a subscriber 12. Instead of such an arrangement where additional switching components are required to terminate the subscriber line 16 using an analog communication device, system 10 terminates the subscriber line 16 using a digital communication device. In particular, modems 60 communicate with communication network 70 using network device 68 of DSLAM 69. In this respect, the subscriber lines 16 of system 10 are terminated at each end using digital communication devices and, therefore, system 10 may provide a more robust compliment of data services to subscribers 12. Other advantages include a potentially higher data rate capacity 80 and 82 for subscriber lines 16 and an increased sampling frequency and associated signal-to-noise ratio for subscriber line 16. Of course, system 10 may still terminate a connection with a modem 42 using an analog communication device associated with POTS.

FIG. 5 illustrates a method for managing subscriber line information 28 for communication system 10. The method begins at step 410 where system management server 18 extracts subscriber line information 28 from various components of system 10 including, for example, information 28 from a plurality of communication servers 58. Typically, this subscriber line information 28 comprises information defining the operational characteristics of subscriber line 16 gathered by modem 60 during modem training. Alternatively, subscriber line information 28 comprises information gathered by modems 60 and 42 operating in a diagnostic mode. In a particular embodiment, information 28 extracted by server 18 comprises the transmit power spectrum density, $Q_f$, and the received power spectrum density, $S_f$, of a data signal communicated between a modem 60 and a modem 42 for each channel of the data frequency spectrum supported by a particular subscriber line 16.

Server 18 determines the attenuation information and noise information for subscriber lines 16 at steps 412 and 414, respectively, using the subscriber line information 28 extracted at step 410 and the attenuation and noise modeling techniques described above with reference to FIG. 1. In a particular embodiment, server 18 determines the attenuation information for subscriber lines 16 according to their constituent binder group segments 46, as described above with reference to FIG. 2. Server 18 determines noise information for subscriber lines 16 by measuring noise characteristics of a subscriber line 16 during operation, or by calculating the noise information using subscriber line information 28 for subscriber line 16, as described above with reference to FIG. 1. System management server 18 stores the attenuation and noise information for subscriber lines 16 in database 22 at step 416. In one embodiment, server 18 stores this information for each subscriber line 16 according to its constituent binder group segments 46, as described above with reference to FIG. 3. Execution terminates at step 418.

FIG. 6 illustrates a method for determining the transmit power spectrum density of a modem 60 or 42 operating on a subscriber line 16. System 18 identifies a subscriber line 16 at step 450. The identified subscriber line 16 may be used by system 10 to provide data services to a new subscriber 12. The provisioning of data services to a new subscriber 12 over a subscriber line 16 in a particular binder group segment 46 may contribute to the noise and distortion upon other subscriber lines 16 within the same binder group segment 46, thereby degrading the services already provided to other subscribers 12 unless the noise contributed by the identified subscriber line 16 is maintained below a determined "noise floor." System 10 identifies subscriber lines 16 having a common binder group segment 46 with identified subscriber line 16, at step 452. System 10 determines noise information for subscriber lines 16 in the common binder group segment 46 at step 454, as described above with reference to FIG. 1. In one embodiment, the determined noise information comprises the noise information for the identified subscriber line 16.

System 10 determines cross-channel-coupling information for subscriber lines 16 at step 456. Database 22 stores the noise information and the cross-channel-coupling information as subscriber line information 28 at step 458. System 10 determines the transmit power spectrum density of modems 60 or 42 operating on the identified subscriber line 16 at step 460, based upon the determined noise and cross-channel-coupling information.

In one embodiment, system 10 determines the transmit power spectrum density of modems 60 or 42 proportional to the noise information for the identified subscriber line 16 and inversely proportional to the cross-channel-coupling information. System 10 selects the appropriate communication protocol for modems 60 or 42 operating on identified subscriber line 16 at step 462, based upon the determined transmit power spectrum density, as described above with reference to FIG. 2. The method concludes at step 464.

FIG. 7 illustrates a method for determining the data rate capacity 80 or 82 of a selected subscriber line 16 of communication system 10. System 10 receives a request to determine the data rate capacity 80 or 82 of a selected subscriber line 16 at step 500. System 10 retrieves subscriber line information 28 from database 22 according to the selected subscriber line 16, a representative subscriber line 16, or the constituent binder group segments 46 of the selected subscriber line 16, at steps 502.

Referring to steps 502, server 18 retrieves attenuation information for the selected subscriber line 16 at step 510, using one of two methods. According to a first method, server 18 retrieves attenuation information for a representative subscriber line 16, as described with reference to FIG. 3. According to a second method, server 18 retrieves attenuation information for each of the constituent binder group segments 46 of the selected subscriber line 16 and associates each of their individual attenuation contributions to determine the approximate total attenuation information for the selected subscriber line 16. Server 18 retrieves noise information for the selected subscriber line 16, at step 512, using one of two methods. According to a first method, server 18 retrieves noise information that is determined using the noise calculation techniques or noise measurement techniques described above with reference to FIG. 1. According to a second method, server 18 retrieves noise information for a representative subscriber line 16. Server 18 determines the appropriate signal-to-noise ratios of subscriber line 16 at step 520 using the attenuation information and noise information determined at steps 510 and 512, respectively, as described above with reference to FIG. 1. Server 18 determines the data rate capacity 80 or 82 of selected subscriber line 16 at step 502 using the signal-to-noise ratios determined at step 522. Execution terminates at step 524.

Figure 8:
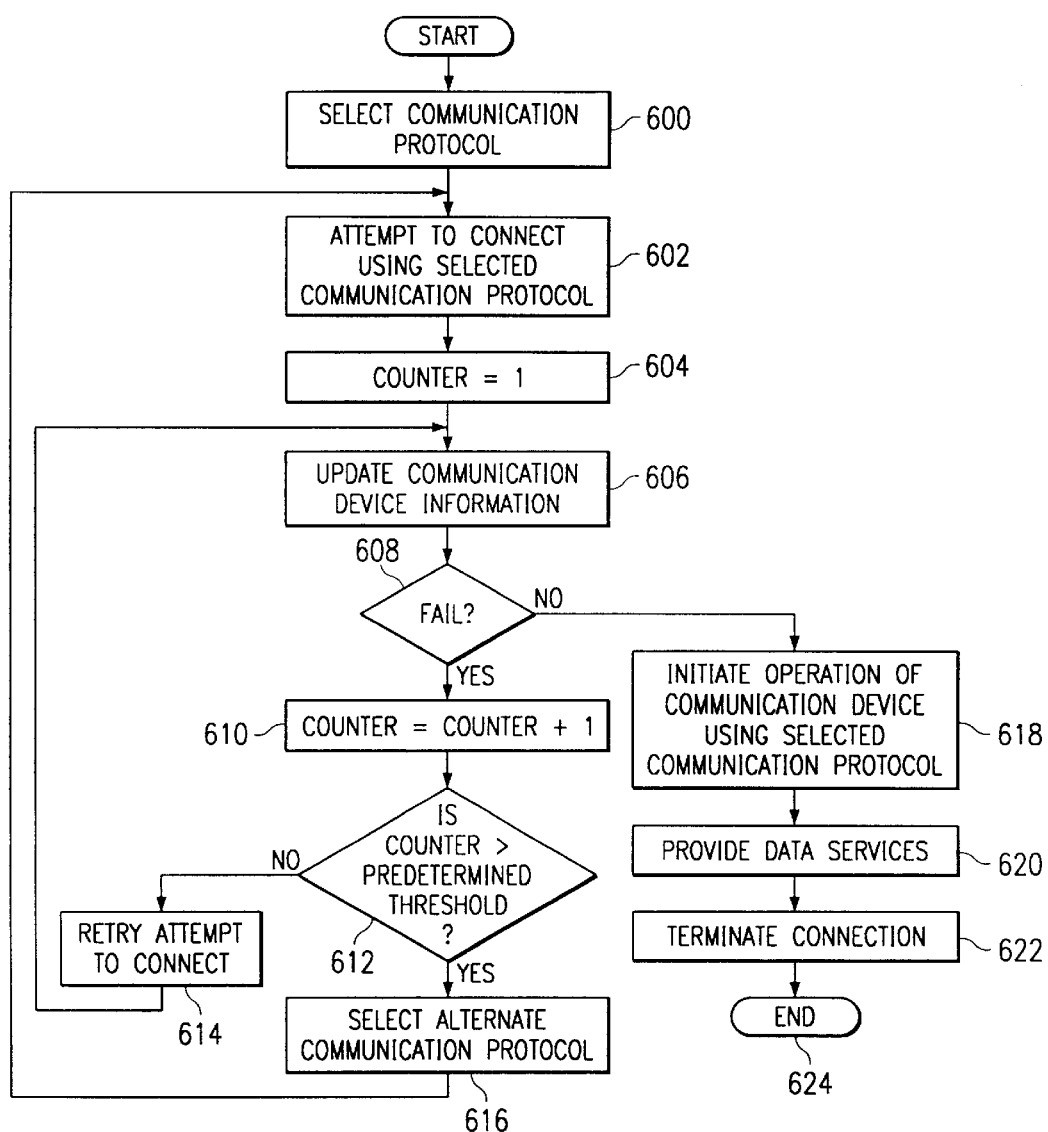
FIG. 8 illustrates a method for determining a communication protocol of a communication device operating on a subscriber line of the communication system.

FIG. 8 illustrates a method for determining a communication protocol of a communication device 60 operating on a subscriber line 16 of system 10. The method begins at step 600 where server 18 selects a communication protocol with which to operate modem 60. Typically, server 18 initially attempts to operate modem 60 using an xDSL communication protocol. Modem 60 attempts to connect with modem 42 using the selected communication protocol at step 602. A counter is initialized to one at step 604 to signify the number of attempts made by the particular modem 60 to connect with a particular modem 42 using the selected communication protocol. Server 18 updates communication device information 29 stored in database 22 at step 606.

Server 18 determines whether the attempt to establish a connection between the particular modems 60 and 42 using the selected communication protocol failed at step 608. If so, execution proceeds to step 610 where server 18 increments the counter by one. Server 18 determines whether the counter is greater than a predetermined threshold at step 612. In particular, server 18 establishes a predetermined number of failed attempts to connect that a particular modem 60 may experience before attempting a connection using an alternative communication protocol. If the counter does not exceed the predetermined threshold as determined at step 612, then execution proceeds to step 614 where modem 60 retries an attempt to connect with the particular modem 42 using the currently selected communication protocol. Execution then proceeds to step 606. If the counter exceeds the predetermined threshold as determined at 612, then execution proceeds to step 616 where server 18 selects an alternative communication protocol with which to connect modems 60 and 42. In one embodiment, server 18 selects a V-series communication protocol to connect modems 60 and 42. Execution then returns to step 602.

If modem 60 does not fail to connect with modem 42 as determined at step 608, execution proceeds to step 618 where server 18 initiates the operation of modem 60 using the selected communication protocol. Communication server 58 provides data services to subscriber 12 at step 620 using the connection established between modems 60 and 42. Communication server 58 terminates the connection between modems 60 and 42 at step 622. Execution terminates at step 624.

What is claimed is:

1. A communication system for determining the transmit power of a communication device operating on a twisted pair subscriber line, comprising:
   a communication server coupled to a first subscriber line and a second subscriber line, the communication server comprising a communication device operable to communicate a signal using the first subscriber line;
   a memory coupled to the communication server and storing noise information and cross-channel-coupling information for the first subscriber line and the second subscriber line; and
   a processor coupled to the memory and operable to determine the transmit power of the communication device based upon the noise information and the cross-channel-coupling information.

2. The communication system of claim 1, wherein the processor determines the transmit power of the communication device proportional to the noise information for the first subscriber line and inversely proportional to the cross-channel-coupling information.

3. The communication system of claim 1, further comprising a second communication device operating on the first subscriber line, wherein the second communication device resides at a subscriber premises coupled to the first subscriber line and the processor is further operable to determine the transmit power of the second communication device based upon the noise information and the cross-channel-coupling information.

4. The communication system of claim 1, wherein the first subscriber line and the second subscriber line each comprise a common binder group segment.

5. The communication system of claim 1, wherein:
   the first subscriber line supports communication using a particular frequency spectrum; and
   the communication device is operable to communicate the signal at a sub-frequency of the frequency spectrum and to receive noise information for the signal measured for the sub-frequency of the frequency spectrum.

6. The communication system of claim 5, wherein the processor is further operable to determine the noise information of the first subscriber line for the frequency spectrum based upon the noise information of the signal measured for the sub-frequency of the frequency spectrum.

7. The communication system of claim 1, wherein the communication device supports communicating data using a plurality of communication protocols and the processor is further operable to select a particular communication protocol based upon the determined transmit power of the communication device.

8. The communication system of claim 7, wherein the selected communication protocol comprises one of Asymmetric Digital Subscriber Line or Symmetric Digital Subscriber Line.

9. The communication system of claim 1, wherein the processor is further operable to determine the data rate capacity of the first subscriber line using the determined transmit power of the communication device.

10. A method for determining the transmit power of a communication device operating on a twisted pair subscriber line, comprising:
    storing noise information for a first subscriber line and a second subscriber line;
    storing cross-channel-coupling information for the first subscriber line and the second subscriber line; and
    determining the transmit power of a communication device operating on the first subscriber line based upon the noise information and the cross-channel-coupling information.

11. The method of claim 10, wherein the step of determining comprises determining the transmit power of the communication device proportional to the noise information for the first subscriber line and inversely proportional to the cross-channel-coupling information.

12. The method of claim 10, wherein the communication device is associated with a communication server coupled to the first subscriber line.

13. The method of claim 10, wherein the communication device is associated with a subscriber premises coupled to the first subscriber line.

14. The method of claim 10, wherein the first subscriber line and the second subscriber line each comprise a common binder group segment.

15. The method of claim 10, wherein:
    the first subscriber line supports communication using a particular frequency spectrum; and
    the step of determining the transmit power of the communication device comprises determining the transmit power of the communication device at a sub-frequency of the frequency spectrum.

16. The method of claim 10, wherein the first subscriber line supports communication using a particular frequency spectrum, the method further comprising:
    communicating a signal at a sub-frequency of the frequency spectrum;
    measuring noise information of the signal for the sub-frequency of the frequency spectrum; and
    determining the noise information of the first subscriber line for the frequency spectrum based upon the noise information of the signal measured for the sub-frequency of the frequency spectrum.

17. The method of claim 10, wherein the communication device supports communicating data using a plurality of communication protocols and further comprising selecting a particular communication protocol based upon the determined transmit power of the communication device.

18. The method of claim 17, wherein the selected communication protocol comprises one of Asymmetric Digital Subscriber Line or Symmetric Digital Subscriber Line.

19. The method of claim 10, further comprising determining the data rate capacity of the first subscriber line using the determined transmit power of the communication device.

20. A communication facility for determining the transmit power of a communication device operating on a twisted pair subscriber line, comprising:
- a memory storing noise information and cross-channel-coupling information for a first subscriber line and a second subscriber line; and
- a processor coupled to the memory and operable to determine the transmit power of a communication device operating on the first subscriber line based upon the noise information and the cross-channel-coupling information.

21. The communication facility of claim 20, wherein the processor determines the transmit power of the communication device proportional to the noise information for the first subscriber line and inversely proportional to the cross-channel-coupling information.

22. The communication facility of claim 20, further comprising a second communication device operating on the first subscriber line, wherein the second communication device is associated with a subscriber premises coupled to the first subscriber line and the processor is further operable to determine the transmit power of the second communication device based upon the noise information and the cross-channel-coupling information.

23. The communication facility of claim 20, wherein the first subscriber line and the second subscriber line each comprise a common binder group segment.

24. The communication facility of claim 20, wherein:
- the first subscriber line supports communication using a particular frequency spectrum; and
- the communication device is operable to communicate a signal at a sub-frequency of the frequency spectrum and to receive noise information for the signal measured for the sub-frequency of the frequency spectrum.

25. The communication facility of claim 24, wherein the processor is further operable to determine the noise information of the first subscriber line for the frequency spectrum based upon the noise information of the signal measured for the sub-frequency of the frequency spectrum.

26. The communication facility of claim 20, wherein the communication device supports communicating data using a plurality of communication protocols and the processor is further operable to select a particular communication protocol based upon the determined transmit power of the communication device.

27. The communication facility of claim 26, wherein the selected communication protocol comprises one of Asymmetric Digital Subscriber Line or Symmetric Digital Subscriber Line.

28. The communication facility of claim 20, wherein the processor is further operable to determine the data rate capacity of the first subscriber line using the determined transmit power of the communication device.

* * * * *